(12) United States Patent
Grove-Nielsen

(10) Patent No.: US 11,090,915 B2
(45) Date of Patent: Aug. 17, 2021

(54) FIXATION OF FIBRE FABRIC LAYERS IN MOULDS FOR WIND TURBINE BLADES

(71) Applicant: Siemens Gamesa Renewable Energy A/S, Brande (DK)

(72) Inventor: Erik Grove-Nielsen, Roslev (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 529 days.

(21) Appl. No.: 15/049,179

(22) Filed: Feb. 22, 2016

(65) Prior Publication Data

US 2016/0250832 A1 Sep. 1, 2016

(30) Foreign Application Priority Data

Feb. 27, 2015 (EP) .................................. 15156916

(51) Int. Cl.

| B29C 70/54 | (2006.01) |
| B29D 99/00 | (2010.01) |
| B32B 27/36 | (2006.01) |
| B32B 37/02 | (2006.01) |
| B32B 37/12 | (2006.01) |
| B29L 31/08 | (2006.01) |

(52) U.S. Cl.
CPC ............ *B32B 27/36* (2013.01); *B29C 70/543* (2013.01); *B29D 99/0025* (2013.01); *B32B 37/02* (2013.01); *B32B 37/12* (2013.01); *B29L 2031/085* (2013.01); *B32B 2250/20* (2013.01); *B32B 2255/02* (2013.01); *B32B 2305/38* (2013.01); *Y02P 70/50* (2015.11)

(58) Field of Classification Search
CPC ................................ B29C 70/30; B29D 99/00
See application file for complete search history.

(56) References Cited

U.S. PATENT DOCUMENTS 3,076,244 A * 2/1963 De Mestral ........ A44B 18/0038
24/584.1
3,142,610 A * 7/1964 Lowe .................... B29C 70/023
428/223

(Continued)

FOREIGN PATENT DOCUMENTS

| CN | 102006994 A | 4/2011 |
| CN | 103862595 A | 6/2014 |

(Continued)

OTHER PUBLICATIONS

Extended European Search Report dated Dec. 23, 2015; Application No. 15156916.7; 10 pgs.

*Primary Examiner* — Matthew J Daniels
*Assistant Examiner* — Andrew D Graham
(74) *Attorney, Agent, or Firm* — Schmeiser, Olsen & Watts LLP

(57) ABSTRACT

A method of manufacturing a rotor blade for a wind turbine is provided. The method includes steps of providing a mould defining an outer shape of a the rotor blade or a portion thereof; arranging a plurality of fibre fabric layers on a surface of the mould having at least one inclined surface portion; and laminating the fibre fabrics layers together by infusing a liquid resin into the mould. A step of interlocking the plurality of fibre fabric layers using at least one mechanical interlocking element prior to laminating the fibre fabric layers together is carried out.

6 Claims, 2 Drawing Sheets

(56) References Cited

U.S. PATENT DOCUMENTS

| | | | | |
|---|---|---|---|---|
| 3,239,590 A * | 3/1966 | Trimble | ............... | B21D 37/20 |
| | | | | 156/230 |
| 3,618,447 A * | 11/1971 | Goins | ............... | F16B 15/0015 |
| | | | | 264/317 |
| 3,622,428 A * | 11/1971 | Robinson | ............ | B29C 70/202 |
| | | | | 156/246 |
| 5,495,935 A * | 3/1996 | Zabron | ............... | B29C 70/081 |
| | | | | 198/847 |
| 5,580,646 A | 12/1996 | Jansz et al. | | |
| 5,876,540 A | 3/1999 | Pannell | | |
| 5,906,269 A * | 5/1999 | Zabron | ............... | B29C 70/081 |
| | | | | 198/846 |
| 7,032,278 B2 * | 4/2006 | Kurtz, Jr. | ............ | A44B 18/0003 |
| | | | | 24/442 |
| 8,479,468 B1 * | 7/2013 | Abbasi | ............... | E04G 23/0218 |
| | | | | 52/408 |
| 8,529,717 B2 | 9/2013 | Hedges et al. | | |
| 2008/0193709 A1 * | 8/2008 | Han | ...................... | B29C 70/10 |
| | | | | 428/100 |
| 2010/0215887 A1 * | 8/2010 | Kawabe | ............... | B29C 43/146 |
| | | | | 428/56 |
| 2010/0227112 A1 * | 9/2010 | Han | ...................... | B29C 65/562 |
| | | | | 428/92 |
| 2010/0314028 A1 | 12/2010 | Hedges et al. | | |
| 2011/0020595 A1 | 1/2011 | Kolax | | |
| 2013/0108824 A1 | 5/2013 | Berger | | |
| 2013/0333823 A1 | 12/2013 | Hedges et al. | | |
| 2015/0316027 A1 * | 11/2015 | Sandercock | ........... | B29C 70/52 |
| | | | | 416/230 |
| 2015/0367583 A1 * | 12/2015 | Blot | ....................... | B29C 70/48 |
| | | | | 264/257 |
| 2016/0176127 A1 * | 6/2016 | Borsting | .............. | B29C 70/388 |
| | | | | 264/138 |

FOREIGN PATENT DOCUMENTS

| | | |
|---|---|---|
| DE | 102012219749 A1 | 5/2013 |
| EP | 2217748 B1 | 9/2011 |
| WO | WO 2010118858 A1 | 10/2010 |

\* cited by examiner tion of Fibre Fabric Layers in Moulds for Wind Turbine Blades

CROSS-REFERENCE TO RELATED APPLICATIONS

This application claims priority to EP 15156916.7, having a filing date of Feb. 27, 2015, the entire contents of which are hereby incorporated by reference

FIELD OF TECHNOLOGY

The present disclosure relates to a method of manufacturing a rotor blade for a wind turbine and a thread, a fibre fabric layer and a mesh for use in the manufacture of a rotor blade for a wind turbine.

BACKGROUND

Wind turbine blades are commonly fabricated of fibre reinforced composite materials such as glass fibre reinforced epoxy plastic or carbon fibre reinforced epoxy plastic. A popular manufacturing method is VARTM or vacuum assisted resin transfer moulding technique which may also be employed for the present invention. A number of fibre fabric layers are placed in a mould forming a stack. The mould is closed and evacuated to low pressure by means of a vacuum pump. Then a liquid resin is infused into the laminate stack and left to cure. After cure, the item can be taken out of the mould and be finalised.

When the fabric layers are placed into the mould, the stiffness of the individual fabric layers helps stabilising the arrangement of the layer onto inclining or vertical surface portions of the mould before vacuum pressure finally consolidates and stabilises the lay-up. As wind turbine blades already reach lengths of 70 metres and continuously increase in size, the root diameters of the blades also increase. The lay-up of reinforcement fabrics on the side walls in the root area of the mould for manufacturing a wind turbine rotor blade is no longer supported sufficiently by the inherent stiffness of the individual layers. For large blades there are substantial problems in arranging and securing the fabric layers, especially on inclined surfaces. In some cases the reinforcement material will slide towards the bottom of the mould cavity before infusion of the blade commences. When the blade is demoulded, the placement of fibre fabrics turns out to be erratic and the blade has to be repaired or even discarded.

To overcome this problem, a liquid adhesive is applied in between the individual fabric layers in order to make the layers stick together and to prevent them from sliding towards the bottom of the mould. Often this tackifier is sprayed on the fabric layers. However, the aerosol spray is hazardous to occupational health because of volatile organic compounds of the adhesive such as Acetone. The adhesive may also contain Bisphenol-A powder or other hazardous epoxy components. Furthermore, as the tackifier is sprayed on the fabric, the fibres are to some degree coated with the tackifier. This may prevent correct flow of the resin once it is infused into the fabric layer stack.

Another tackifier system uses a thermoplastic which is called a hot melt. After application, the hot melt causes the neighbouring fabric layers to stick together. However, when the hot melt is applied with a spray gun by a worker, there is a risk that too much hot melt is applied in some areas and a thermoplastic film layer may form in some places. Since the thermoplastic layer is not soluble in the epoxy resin, it does not bond well to the resin which causes a risk of delamination failures in such laminates.

SUMMARY

An aspect relates to a method of manufacturing a rotor blade for a wind turbine. The method includes steps of:
providing a mould defining an outer shape of a the rotor blade or a portion thereof;
arranging a plurality of fibre fabric layers on a surface of the mould having at least one inclined surface portion; and
laminating the fibre fabrics layers together by infusing a liquid resin into the mould.

According to embodiments of the invention a step of interlocking the plurality of fibre fabric layers using at least one mechanical interlocking element is carried out prior to laminating the fibre fabric layers together.

The inventive method is advantageous in that the mechanical interlocking elements, e.g. when placed between adjacent fibre fabric layers, attach to some of the fabric fibres of both adjacent fibre fabric layers. In this way the individual fabric layers are mechanically coupled such that none of the layers may slip on an underlying layer. Thus, the placement of the layers in the layer stack within the mould may be maintained throughout the following lamination procedure and quality and yield of the manufacture will increase.

The mechanical interlocking elements may be fabricated from thermoplastic material, however, since the mechanical interlocking elements are located only at discrete points of the laminate, the thermoplastic will not form a layer impairing the robustness of the laminate.

The at least one mechanical interlocking element may be provided together with and within one of the fibre fabric layers. If the mechanical interlocking elements are provided within the one fibre fabric layer, a step of distributing the mechanical interlocking elements across the fibre fabric layer can be omitted resulting in a faster manufacturing process. Furthermore, placement of the mechanical interlocking elements can be carried out during manufacture of the fibre fabric layer which ensures equidistant placement of the mechanical interlocking elements. The fibre fabric layer comprising the mechanical interlocking elements can be cut as needed and the patches tailored in this manner will always comprise a suitable number of mechanical interlocking elements that is approximately proportional to the surface area of the patch.

When a fibre fabric layer containing the mechanical interlocking elements is used, the method according to embodiments of the invention may further include a step of pressing the one of the fibre fabric layers. In this way a locking end of the at least one mechanical interlocking element provided within the one of the fibre fabric layers may be exposed. The plurality of fibre fabric layers may be interlocked by fastening the exposed locking end to a fibre fabric layer adjacent to the one fibre fabric layer. This provides for a very quick way of interlocking the individual fibre fabric layers.

In particular, the method may further include arranging an additional fibre fabric layer onto the one of the fibre layers on a side of the one of the fibre layers opposing the neighbouring fibre fabric layer and fastening the additional fibre fabric layer to the one of the fibre fabric layers including the at least one mechanical interlocking element. A stack of fibre fabric layers may be formed easily by alternating fibre fabric layers with and without mechanical interlocking elements incorporated into the respective fibre fabric layer.

Alternatively or additionally the step of interlocking the plurality of fibre fabric layers may include injecting at least one mechanical interlocking element into the plurality of fibre fabric layers thereby perforating at least one of the fibre fabric layers with the at least one mechanical interlocking element. Here the mechanical interlocking element works like a dowel or peg effectively stapling the fibre fabric layers together.

Subsequently the injected mechanical interlocking element may be partially retracted to thereby fold out a plurality of barbs from the mechanical interlocking element. The barbs will grip the fabric and lock the laminate.

The method according to embodiments of the invention may further include a step of placing a thread or mesh having a plurality of mechanical interlocking elements between two of the fibre fabric layers. The step of interlocking the plurality of fibre fabric layers may include fastening the two of the fibre fabric layers to the mechanical interlocking elements of the thread or mesh. Herein a mesh includes openings that are much larger than the threads surrounding the openings. Contrary to this a fibre fabric has only very small openings—if any at all—and will usually appear opaque to the naked eye. The thread or mesh serves as a carrier for the mechanical interlocking elements to which the mechanical interlocking elements are attached. In this way the mechanical interlocking elements may be provided at preconfigured distances from each other. Since the mesh possesses large openings, the mesh hardly interferes with the lamination process such that bonding of the fibre fabric layers is of superior quality when compared to the prior art. The thread or mesh may be made from thermoplastic material.

The method according to embodiments of the invention may further include a step of manufacturing a plurality of mechanical interlocking elements by cutting a helically shaped blank along a length direction of the blank. This provides a large number of mechanical interlocking elements having an arcuate or bent shape that may function as hooks.

A second aspect of the invention provides a thread including a plurality of mechanical interlocking elements arranged along the thread and protruding from the thread in at least three different directions. Preferably the three different directions are at least approximately equiangularly arranged around the thread length axis. This ensures that always at least one mechanical interlocking element will lock to either one of the adjacent fibre fabric layers.

Another aspect of the invention provides a fibre fabric layer for manufacturing a rotor blade for a wind turbine, the fibre fabric layer including a plurality of mechanical interlocking elements arranged across the fibre fabric layer. The fibre fabric layer may be used in embodiments of the invention manufacturing method. The mechanical interlocking elements of the fibre fabric layer may be embedded into the fibre fabric layer.

Yet another aspect of the invention provides a mesh including a plurality of mechanical interlocking elements arranged across the mesh. The mechanical interlocking elements protrude from both opposing sides of the mesh. The mesh may be placed between two layers of fibre fabric and be used to lock the two fibre fabric layers.

The fibre fabric layer or the mesh may include a separator arranged on one side of the layer or mesh. The separator may be a paper or such and prevents the mechanical interlocking elements from locking to the fibre fabric layer or mesh itself. Using a separator, the fibre fabric layer or mesh may be rolled up and transported as a roll.

Preferably the mechanical interlocking elements are made from thermoplastic material, preferably from thermoplastic polyester. Thermoplastic material is light-weight, inexpensive and may be processed and manufactured easily.

Preferably the mechanical interlocking elements are formed as hooks or spikes. The hooks or spikes may have a length of about 0.5 to 5 millimetres. The hooks or spikes may have a diameter of about 0.1 to 1 millimetres. The dimensions given for a hook refer to the hook thread rather than to the size of the curved hook formed from the hook thread.

BRIEF DESCRIPTION

Some of the embodiments will be described in detail, with reference to the following figures, wherein like designations denote like members, wherein.

DETAILED DESCRIPTION

Figure 1:
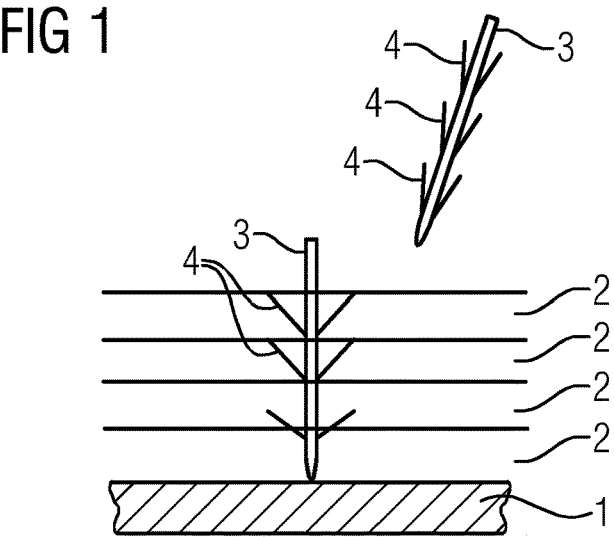
FIG. 1 shows a detail from a rotor blade manufactured using a first embodiment.

FIG. 1 shows a detail from a rotor blade manufactured using a first embodiment of the present invention. A plurality of fibre fabric layers 2 are placed in a mould 1 which defines an outer shape of a rotor blade for a wind turbine or a portion thereof. The mould 1 comprises an inclined portion where the layers 2 can slip out of place due to their own weight or that of the neighbouring layers 2. When the stack of layers 2 is infused with liquid resin, a deformed rotor blade may be formed due to an accidental displacement of the layers 2 in the mould 1.

In order to prevent this defect, embodiments of the invention include interlocking the layers 2 with each other by placing mechanical interlocking elements 3 at singular points having a distance from each other. In FIG. 1 one example of such a mechanical interlocking element 3 is shown prior to and after insertion into the stack of fibre fabric layers 2. Here, the mechanical interlocking element 3 assumes the form of a dowel or bolt that will perforate at least one of the fibre fabric layers 2 during insertion into the stack. The dowel or bolt 3 includes barbs 4 that will engage with the fibre fabric of the layers 2 once the inserted or injected dowel or bolt is slightly pulled backwards and will thereby interlock the fibre fabric layers 2. For example, the mechanical interlocking element 3 as shown in FIG. 1 could be injected into the fibre fabric layers 2 using air pressure.

Figure 2:
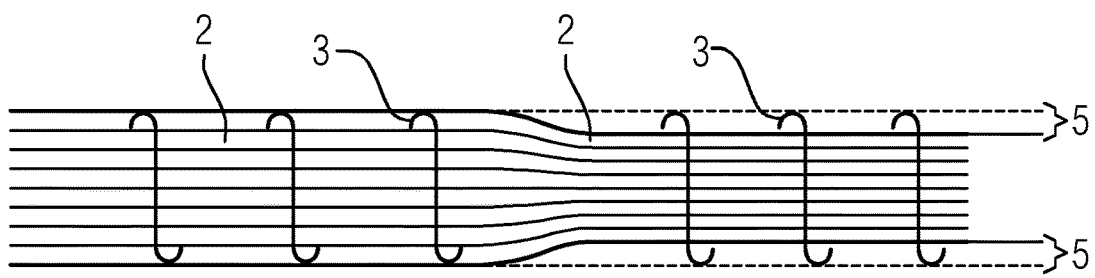
FIG. 2 shows an embodiment of a preferred fibre fabric layer.

FIG. 2 shows an embodiment of a preferred fibre fabric layer according to the present invention. In order to avoid manual placement of the mechanical interlocking elements 3, preconfigured produces including a plurality of mechanical interlocking elements 3 may be used. One such produce is a fibre fabric layer 2 wherein a plurality of mechanical interlocking elements 3 is embedded into the fabric. On the left side the mechanical interlocking elements 3 are completely hidden in the fabric while on the right side locking ends 5 of the mechanical interlocking elements are exposed on either sides of the fabric layer 2. The fabric layer 2 may be manufactured both with the locking ends of the mechanical interlocking elements covered or exposed. However, the configuration on the left hand side is preferred. This is because the fibre fabric layer 2 may be compressible and thus be pressed, e.g. using a roller or similar device, such that the locking ends 5 of the mechanical interlocking elements will perforate the surface(s) of the fibre fabric layer 2 wherein they are embedded. This will expose the locking ends 5 as shown on the right side of FIG. 2. The exposed locking ends 5 may then engage with an adjacent fibre fabric layer. In FIG. 2 the locking ends 5 assume the form of hooks, however, other forms may be used such as spikes with or without barbs.

If the mechanical interlocking elements 3 are embedded into the fibre fabric layer 2, there is no need for a separator paper or similar and the fibre fabric layer 2 may be transported in a rolled up manner and unrolled when needed during manufacture of the wind rotor blade.

Figure 3:
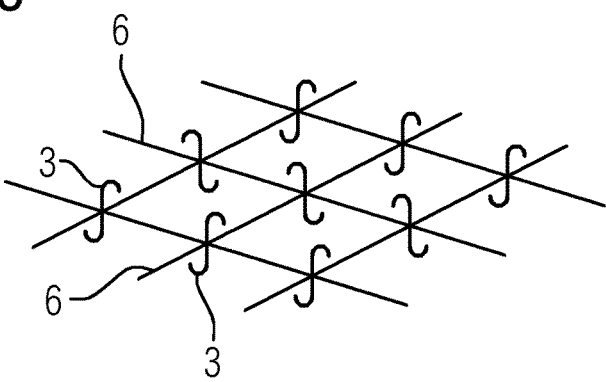
FIG. 3 shows an embodiment of a mesh.

FIG. 3 shows an embodiment of a mesh 6 according to the present invention. The mesh 6 may have rectangular openings with the mechanical interlocking elements 3 arranged at the knots of the mesh, i.e. at the corners of the openings. Other configurations like triangular or hexagonal openings may be devised. The mesh 6 may be arranged between two neighbouring fibre fabric layers 2 during manufacture of the wind rotor blade. The mechanical interlocking elements 3 in FIG. 3 preferably include at least two locking ends oriented in opposing directions. For example, a pyramidal arrangement of four locking ends or an arrangement of six locking ends similar to that of a "Czech hedgehog" may be used. This guarantees that at least one locking end is inserted into either of the adjacent fibre fabric layers 2 during the manufacturing process.

The large openings of the mesh 6 do not obstruct the flow of liquid resin to the effect that delamination failures observed in the prior art may be prevented. Since the mesh 6 may be flexible and the mechanical interlocking elements 3 may move relative to each other during transport or handling, the mesh 6 may be releasably attached to a separator having a light adhesive or the like applied at one side of the separator.

Figure 4:
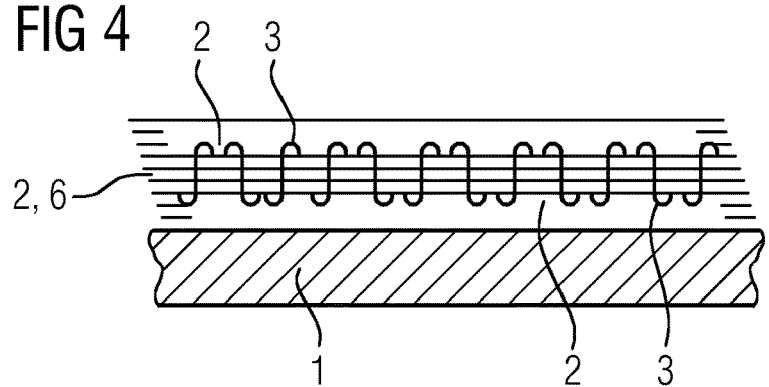
FIG. 4 shows an embodiment of a stack of interlocked fibre fabric layers.
Figure 5:
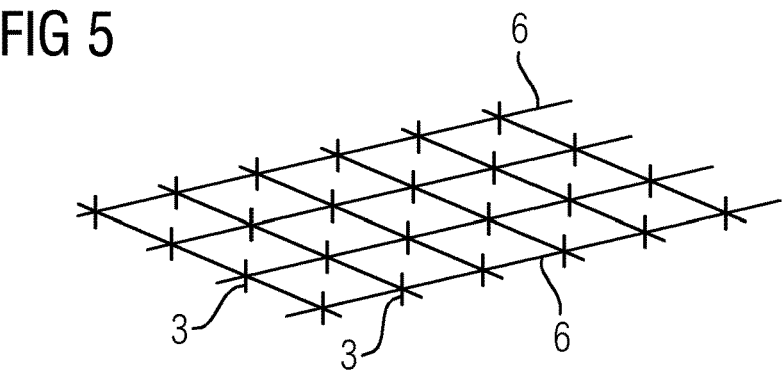
FIG. 5 shows another embodiment of a mesh.

FIG. 4 shows a stack of interlocked fibre fabric layers according to embodiments of the present invention. A plurality of fibre fabric layers 2 is arranged in a mould 1. A fibre fabric layer 2 including mechanical interlocking elements 3 or a mesh 6 as shown in FIG. 3 or 5 is placed between a bottom fibre fabric layer and a top fibre fabric layer. The stack of layers 2 is pressed against the mould 1 and locking ends of the mechanical interlocking elements 3 fasten the layers 2 to each other. Other layers 2 may be added with meshes 6 inserted in between as needed. The mechanical interlocking element 3 formed like a dowel or bolt as shown in FIG. 1 may be used in addition to the mesh 6 or layer 2 comprising the mechanical interlocking elements 3. For example, the dowel or bolt may be used in places of the mould 1 that are particularly prone to displacement of fibre fabric layers 2 during the manufacturing process of the wind rotor blade and where the degree of fixation provided by the mechanical interlocking elements of the mesh or fibre fabric layer appears insufficient.

FIG. 5 shows another embodiment of a mesh 6 according to the present invention. The mesh 6 is similar to that shown in FIG. 3 and what was said in conjunction with FIG. 3 also applies to the embodiment of FIG. 5 unless stated to the contrary. In the embodiment of FIG. 5 the mechanical interlocking elements 3 are formed as spikes. The spikes may have a triangular form optionally including barbs. For example, the spikes may be formed similar to shark teeth.

Figure 6:
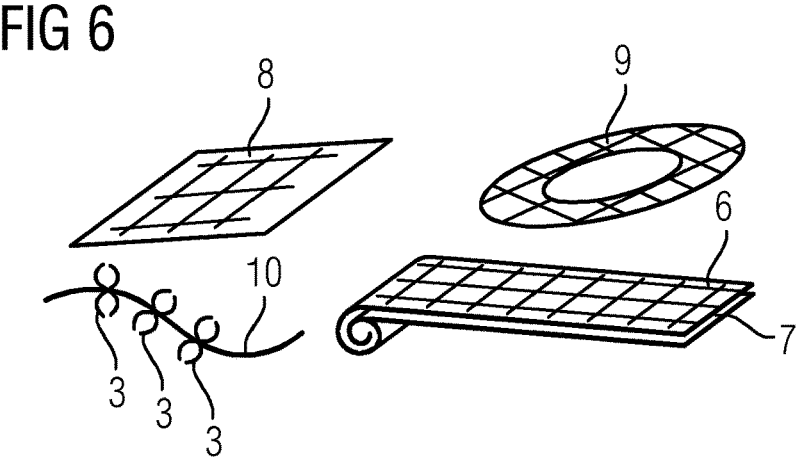
FIG. 6 shows further inventive produces.

FIG. 6 shows further inventive produces according to embodiments of the invention. As shown, the mesh 6 of embodiments of the invention may be applied to a separator 7 and may be rolled up. It is also possible to use rectangular or circular patches 8, 9 of mesh including mechanical interlocking elements. Embodiments of the invention also include a thread 10 including mechanical interlocking elements 3 distributed along the thread 10. The thread can be used in the same or similar fashion as described above for the mesh provided by embodiments of the present invention.

Although the invention has been shown and described with respect to exemplary embodiments thereof, various other changes, omissions, and additions in form and detail thereof may be made therein without departing from the spirit and scope of the invention.

While the invention has been described in connection with a preferred embodiment, it is not intended to limit the scope of the invention to the particular form set forth, but on the contrary, it is intended to cover such alternatives, modifications, and equivalents as may be included within the scope of the invention as defined by the appended claims.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of manufacturing a rotor blade for a wind turbine, the method comprising:
    providing a mould configured to define an outer shape of at least a portion of the rotor blade;
    arranging a plurality of fibre fabric layers on a surface of the mould having at least one inclined surface portion to form a stack of fibre fabric layers, the stack formed by alternating fibre fabric layers with and without an at least one mechanical interlocking element embedded into the fibre fabric layer such that the at least one mechanical interlocking element is completely hidden in the fibre fabric layer;
    pressing the fibre fabric layers to expose a locking end of the at least one mechanical interlocking element embedded and completely hidden provided within the fibre fabric layers and interlocking the plurality of fibre fabric layers by fastening the exposed locking end to a neighbouring fibre fabric layer that does not include at least one mechanical interlocking element; and
    laminating the plurality of fibre fabric layers together by infusing a liquid resin into the mould.

2. The method according to claim 1, wherein the step of interlocking the plurality of fibre fabric layers includes injecting the at least one mechanical interlocking element into the plurality of fibre fabric layers thereby perforating at least one of the fibre fabric layers with the at least one mechanical interlocking element.

3. The method according to claim 2, further including partially retracting the injected at least one mechanical interlocking element to thereby fold out a plurality of barbs from the at least one mechanical interlocking element.

4. The method according to claim 1, further including a step of placing a thread or mesh including a plurality of mechanical interlocking elements between two of the fibre fabric layers, wherein the step of interlocking the plurality of fibre fabric layers includes fastening the two of the fibre fabric layers to the plurality of mechanical interlocking elements of the thread or mesh.

5. The method according to claim 1, further including a step of manufacturing a plurality of mechanical interlocking elements, which are configured to be manufactured by cutting a helically shaped blank along a length direction of the helically shaped blank.

6. A method of manufacturing a rotor blade for a wind turbine, the method comprising:
- providing a mould configured to define an outer shape of the rotor blade or a portion thereof;
- arranging a plurality of fibre fabric layers on a surface of the mould having at least one inclined surface portion;
- compressing the plurality of fibre fabric layers to thereby expose a locking end of an at least one mechanical interlocking element embedded within the plurality of fibre fabric layers such that the at least one mechanical interlocking element is completely hidden in the fibre fabric layer;
- interlocking the plurality of fibre fabric layers by fastening the exposed locking end to a neighbouring fibre fabric layer prior to laminating the plurality of fibre fabric layers together; and
- laminating the plurality of fibre fabric layers together by infusing a liquid resin into the mould.

* * * * *